United States Patent [19]

Ledent

[11] 4,209,065
[45] Jun. 24, 1980

[54] THERMAL-OPERATED VALVE FOR CONTROL OF COOLANT RATE OF FLOW IN OIL WELLS

[75] Inventor: Pierre Ledent, Tilff, Belgium

[73] Assignee: Institut National des Industries Extractives, Liege, Belgium

[21] Appl. No.: 960,098

[22] Filed: Nov. 13, 1978

[30] Foreign Application Priority Data

Nov. 16, 1977 [BE] Belgium .................................. 46232

[51] Int. Cl.$^2$ ............................................. E21B 43/00
[52] U.S. Cl. ....................................... 166/64; 251/11; 239/75; 137/79
[58] Field of Search .......................... 166/64, 332, 53; 251/11; 239/75; 165/45; 137/79

[56] References Cited

U.S. PATENT DOCUMENTS

| 2,610,300 | 9/1952 | Walton et al. ...................... 251/11 X |
| 2,647,017 | 7/1953 | Coulliette ........................... 251/11 X |
| 3,456,722 | 7/1969 | Cornelius ............................... 166/64 |
| 3,780,803 | 12/1973 | Hardy et al. ........................ 166/64 X |

FOREIGN PATENT DOCUMENTS 736770  6/1966  Canada ...................................... 175/64

Primary Examiner—Ernest R. Purser
Assistant Examiner—Richard E. Favreau
Attorney, Agent, or Firm—Martin A. Farber

[57] ABSTRACT

A thermally operated valve for automatic control of the rate of flow of a fluid coolant for hot gases produced by underground gasification of solid fuel deposits or by in situ combustion in oil wells, incorporating a temperature-sensitive element comprising a metal tube several meters long to be incorporated in a pipe for supplying coolant to the well, and a rod of a metal having a low coefficient of expansion coaxial with the pipe, the upper end of which rod is attached to the upper part of the metal tube and the lower end of which rod is flexibly connected to a valve member by a connecting element having adjustable clearance or play.

5 Claims, 2 Drawing Figures

THERMAL-OPERATED VALVE FOR CONTROL OF COOLANT RATE OF FLOW IN OIL WELLS

The underground gasification of coal and the exploitation of oil wells by in situ combustion may result in gas being produced at high temperature. To obviate damage to tubing and prevent the cementing from being damaged by excessive temperatures, cooling means must be provided at the bottom of the wells.

Cooling is usually obtained by spraying a fluid (generally water) which evaporates on contact with the gas. When this type of cooling is used, a reliable and rapid means must enable the rate of flow of coolant to be varied according to requirements. If the rate of flow is too low there is a risk of the tube overheating. If it is too high there is a risk of water penetrating into the field.

U.S. Pat. No. 3,456,722 and Belgian Pat. No. 847,383 give two examples of thermal-operated valves for controlling the rate of flow of fluid coolant.

In both cases the valve is controlled by the differential expansion of two concentric metal cylinders, the temperature of which varies as a result of the stream of hot gas.

These systems have two disadvantages however: the valve opening depends only on the temperature of the gas entering the well, and does not vary with the rate of flow of the gas. If this rate of flow increases, the amount of water injected may be insufficient. If it decreases, the amount of water injected may be excessive.

The metal device which controls the opening of the valve is in direct contact with the gas at the place where it is hottest and it may be damaged if the temperature of the gas reaches a very high level.

The object of this invention is an improved thermal-operated valve means to obviate these disadvantages and automatically control the rate of flow of fluid coolant in such a manner that the temperature of the mixture of gas and vapour rising through the well is maintained within a temperature range which can be selected at will.

To this end, the temperature-sensitive element comprises a metal tube several meters long interposed in the fluid supply pipe and a coaxial rod made of metal of low coefficient of expansion, the top end of which is connected to the top part of the metal tube and the bottom end of which is connected to the valve through a connecting element having an adjustable clearance or play.

The principle of the system is illustrated solely by way of example in the accompanying drawings wherein.

Figure 1:
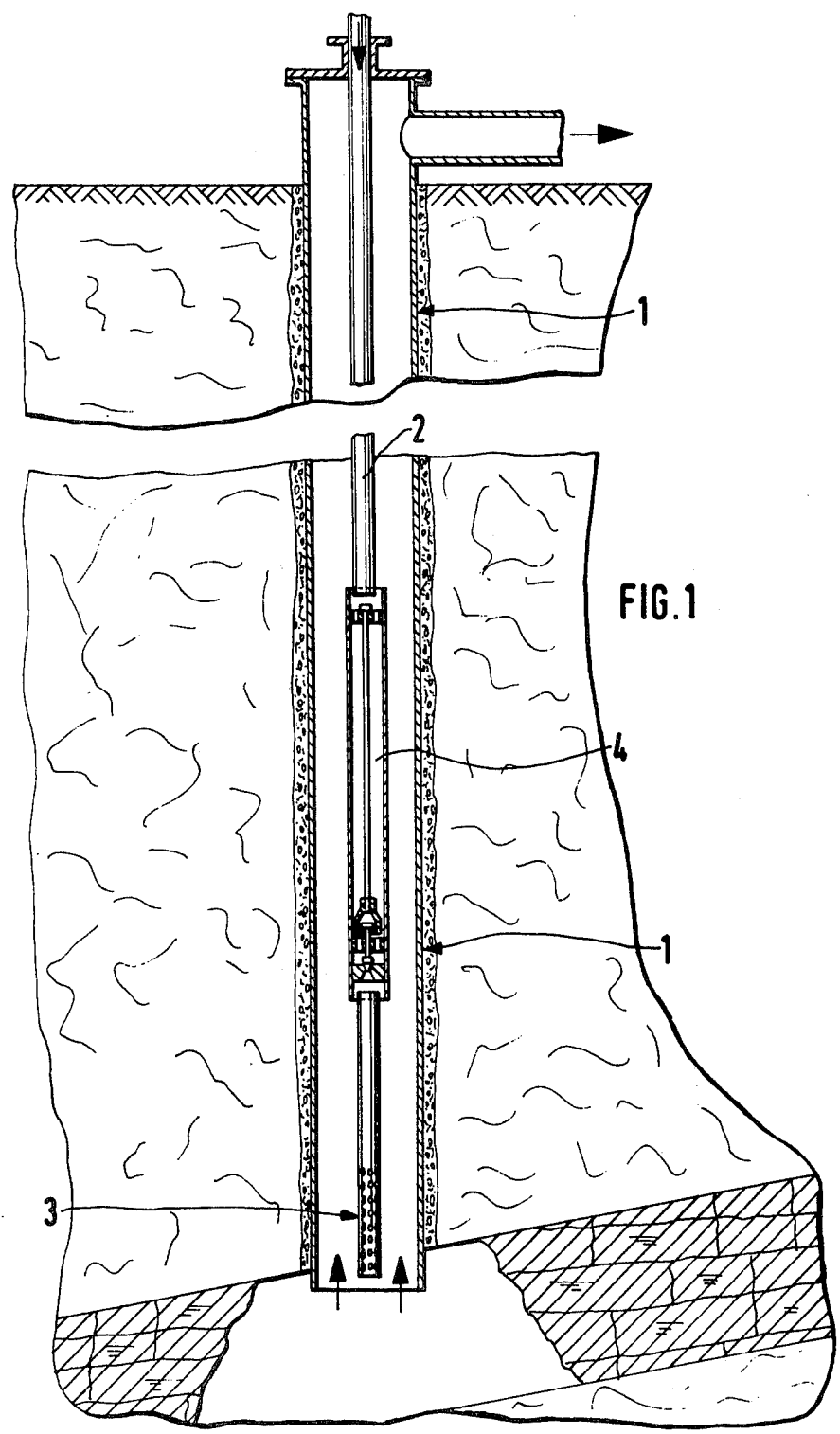
FIG. 1 is a longitudinal section through the well axis.
Figure 2:
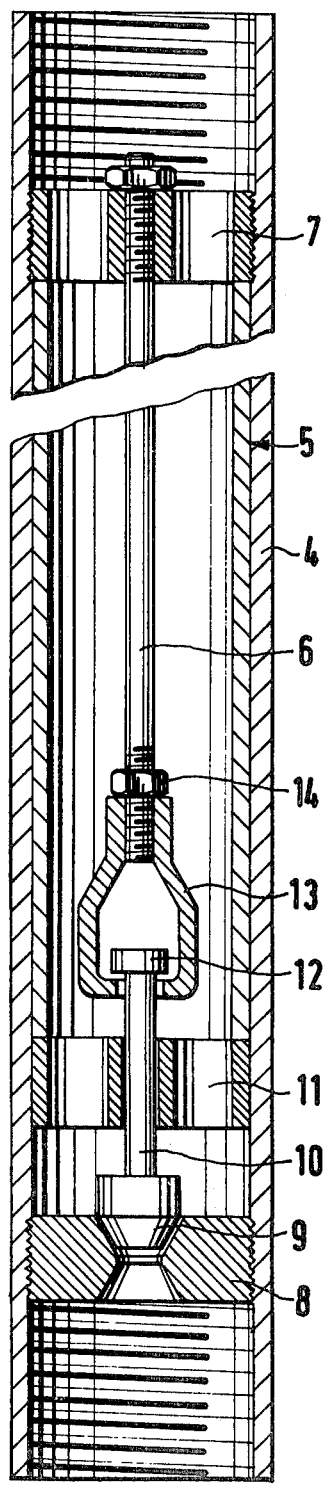
FIG. 2 is a longitudinal section to an enlarged scale through the thermal-operated valve which controls the rate of flow of water.

The well for collecting the gases is lined with a metal tubing 1 which is connected to the earth by cementing of suitable quality. A smaller-diameter tube 2 is disposed inside the tubing and is used for supplying the fluid coolant, which is distributed at the base of the gas well by a perforate tube 3 or any other suitable spraying means.

The means of controlling the rate of flow of fluid coolant is disposed in the fluid supply pipe far enough away from the bottom end of this pipe for the mixture of gas and vapour from the fluid coolant to have had time to become homogenized before reaching the control means. The latter consists of a metal tube 4 lined with a layer 5 of impermeable material having low thermal conductivity. A rod 6 is disposed along the tube axis and consists of a nickel steel having a low coefficient of expansion (of the Invar type).

The rod 6 and the metal tube 4 are rigidly connected by a device 7 comprising a number of radial fins disposed near the top end of the tube 4.

At the bottom end of the tube 4 there is a valve comprising a horizontal seat 8, a valve head 9 resting on the seat with a frustoconical surface, a rod 10 sliding in a guide 11 connected to the tube 4 by a number of radial fins, and a widened shank 12. The valve lift is produced by means of a yoke 13 which is screwed on to the end of the rod 6 and the position of which can be adjusted as desired, and which is locked by a lock nut 14.

The resulting system can automatically control the rate of flow of fluid coolant within a temperature range which may be selected at will, such selection being determined by the length of the tube 4 and the rod 6 and the play or clearance J between the valve shank 12 and the yoke 13 when the system is assembled.

By way of example, it will be assumed that the maximum temperature of the mixture of gas and vapour rising through the well is to be kept between 200° and 250° C.

To this end, the valve 9 must be kept closed until the gas reaches a temperature of 200° C., and it must so open that maximum opening is reached when the temperature of the mixture is 250° C.

Taking into account the insulating layer 5, it may be assumed that the temperature of the tube 4 will at all times be very close to the temperature of the mixture of gas and vapour rising in the annular space defined by the tubes 1 and 4.

Since the fluid coolant supply pressure, its evaporation heat, and the maximum possible temperatures and rates of flow of the gas from the underground well are known, the diameter of the valve 9 and the maximum opening E that is advantageously given can be so calculated that the temperature of the mixture of gas and vapour cannot ever exceed 250° C.

The following symbols are adopted for calculation of the control system:

L: length of rod 6 in meters;

J: play or clearance provided on assembly between the valve shank 12 and the yoke 13 in meters;

E: maximum valve opening in meters;

$T_o$: ambient temperature on assembly of system in °C.;

$T_4$: mean temperature of tube 4 in °C.;

$T_6$: mean temperature of rod 6 in °C.;

$\lambda_4$: coefficient of linear expansion of the metal of the tube 4 in °C.$^{-1}$;

$\lambda_6$: coefficient of linear expansion of the metal of the rod 6 in °C.$^{-1}$.

Opening of the valve as a result of the differential expansion of the tube 4 and rod 6 may be expressed by the equation:

$$e = L\lambda_4(T_4 - T_o) - L\lambda_6(T_6 - T_o) - J \tag{1}$$

If $\lambda_6$ is negligible with respect to $\lambda_4$, the equation (1) is simplified as follows:

$$e = L\lambda_4(T_4 - T_o) - J \tag{2}$$

If the opening is to be zero at $T_4 = 200°$ C., then:

$$L\lambda_4(200-T_o)-J=0$$

and if the opening is to have the value E at $T_4=250°$ C., then:

$$E=L\lambda_4(250-T_o)-J.$$

The following may be derived from these equations:

$$L=E/(50\times\lambda_4) \quad (3)$$

and $$J=E\times(200-T_o)/50 \quad (4)$$

If the numerical values of E, $\lambda_4$ and $T_o$ are respectively 2 mm, $\lambda_4=12.10^{-6}(°C.)^{-1}$ and $T_o=20°$ C., then $$L=2.10^{-3}/(50\times 12.10^{-6})=3.33 \text{ m}$$

and $$J=2.10^{-3}\times(180/50)=7.2.10^{-3} \text{ m or } 7.2 \text{ mm}.$$

What is claimed is:

1. A thermally operated valve for automatic control of the rate of flow of a fluid coolant for hot gases produced by underground gasification of solid fuel deposits or by in situ combustion in oil wells, incorporating a temperature-sensitive element comprising a metal tube several meters long to be incorporated in a pipe for supplying coolant to the well, and a rod of a metal having a low coefficient of expansion coaxial with the pipe, the upper end of which rod is attached to the upper part of the metal tube and the lower end of which rod is connected to a valve member by a connecting element having adjustable clearance or play, the metal tube is lined with a layer of impermeable material having a low coefficient of thermal conductivity.

2. A thermally operated valve for automatic control of the rate of flow of a fluid coolant for hot gases produced by underground gasification of solid fuel deposits or by in situ combustion in oil wells, incorporating a temperature-sensitive element comprising a metal tube several meters long to be incorporated in a pipe for supplying coolant to the well, and a rod of a metal having a low coefficient of expansion coaxial with the pipe, the upper end of which rod is attached to the upper part of the metal tube and the lower end of which rod is connected to a valve member by a connecting element having adjustable clearance or play, the metal rod is made of nickel steel of the "Invar" type.

3. A thermally operated valve for automatic control of the rate of flow of a liquid for cooling the gases obtained by underground gasification of solid fuel deposits or by combustion in situ of petroleum deposits incorporating a temperature-sensitive element formed of a metal tube interposed in a conduit and by a metal rod having a low coefficient of expansion, mounted coaxially in said tube and connected on the one hand to one end of said tube and on the other hand to the valve, wherein
   the metal tube is of great length extending over several meters,
   the upper end of the metal rod is connected to the upper end of the tube, and
   connecting means which has adjustable play for flexibly connecting the lower end of the metal rod to the valve.

4. A thermally operated valve for automatic control of the rate of flow of a fluid coolant for hot gases produced by underground gasification of solid fuel deposits or by in situ combustion in oil wells, incorporating a temperature-sensitive element comprising a metal tube several meters long to be incorporated in a pipe for supplying coolant to the well, and a rod of a metal having a low coefficient of expansion coaxial with the pipe, the upper end of which rod is attached to the upper part of the metal tube and the lower end of which rod is connected to a valve member by a connecting element having adjustable clearance or play, the connecting element between the valve member and the rod is a yoke-shaped element attached by screw threads to the lower end of the rod and held in place by a lock nut.

5. The valve as set forth in claim 4, wherein
   said yoke has a bottom with an opening,
   a guide secured to the metal tube,
   a second rod is connected to the valve, is slidably guided in said guide and extends into said opening, said second rod has a widened shank at its top disposed in said yoke, said widened shank is spaced above said bottom in a closed position of the valve and is larger than said opening,
   said lock nut, the screw threads and the lower end of the rod are adjustable relative to each other.

* * * * *